March 17, 1925.
H. LANGE
GAS RANGE OR COOKING STOVE
Filed Aug. 16, 1924     3 Sheets-Sheet 1
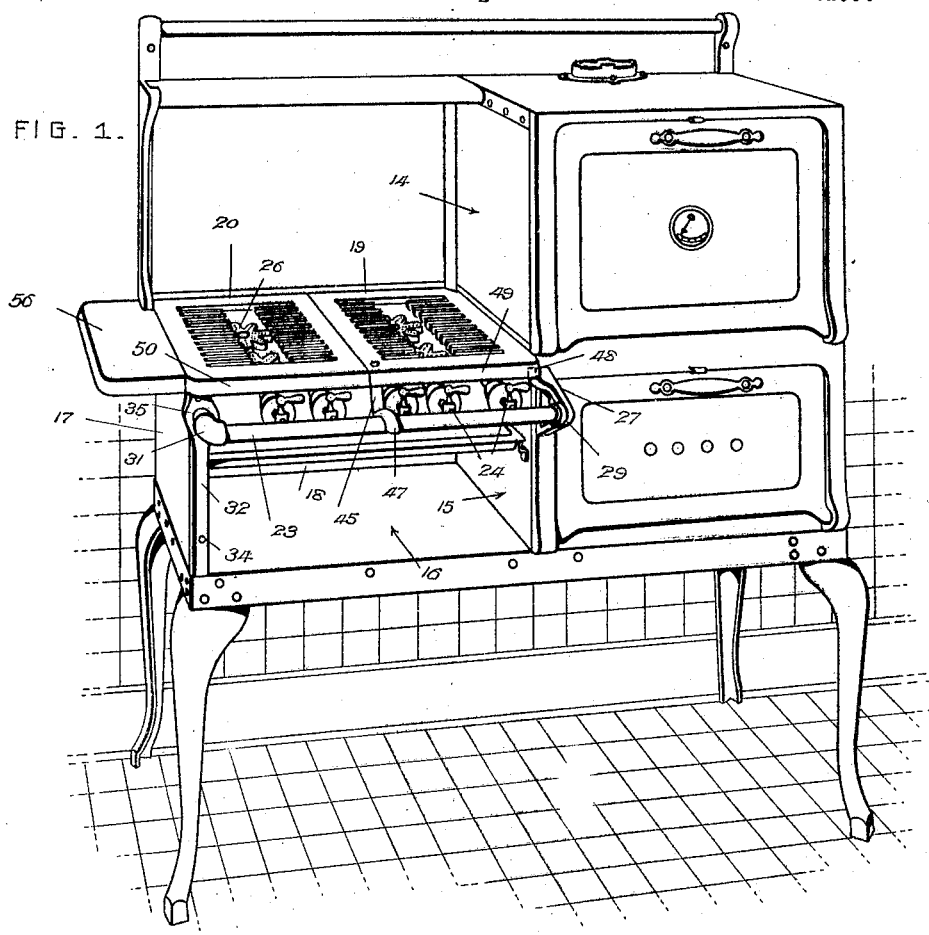
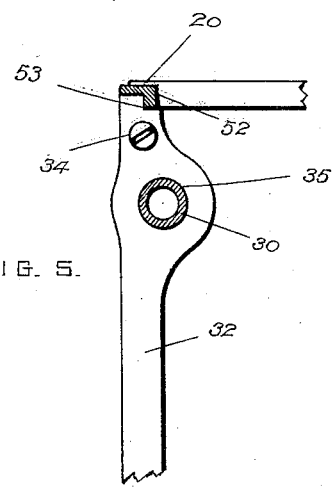
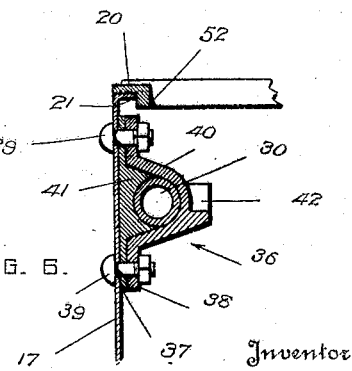
Inventor:
HENRY LANGE,
By Monroe C. Miller
Attorney.

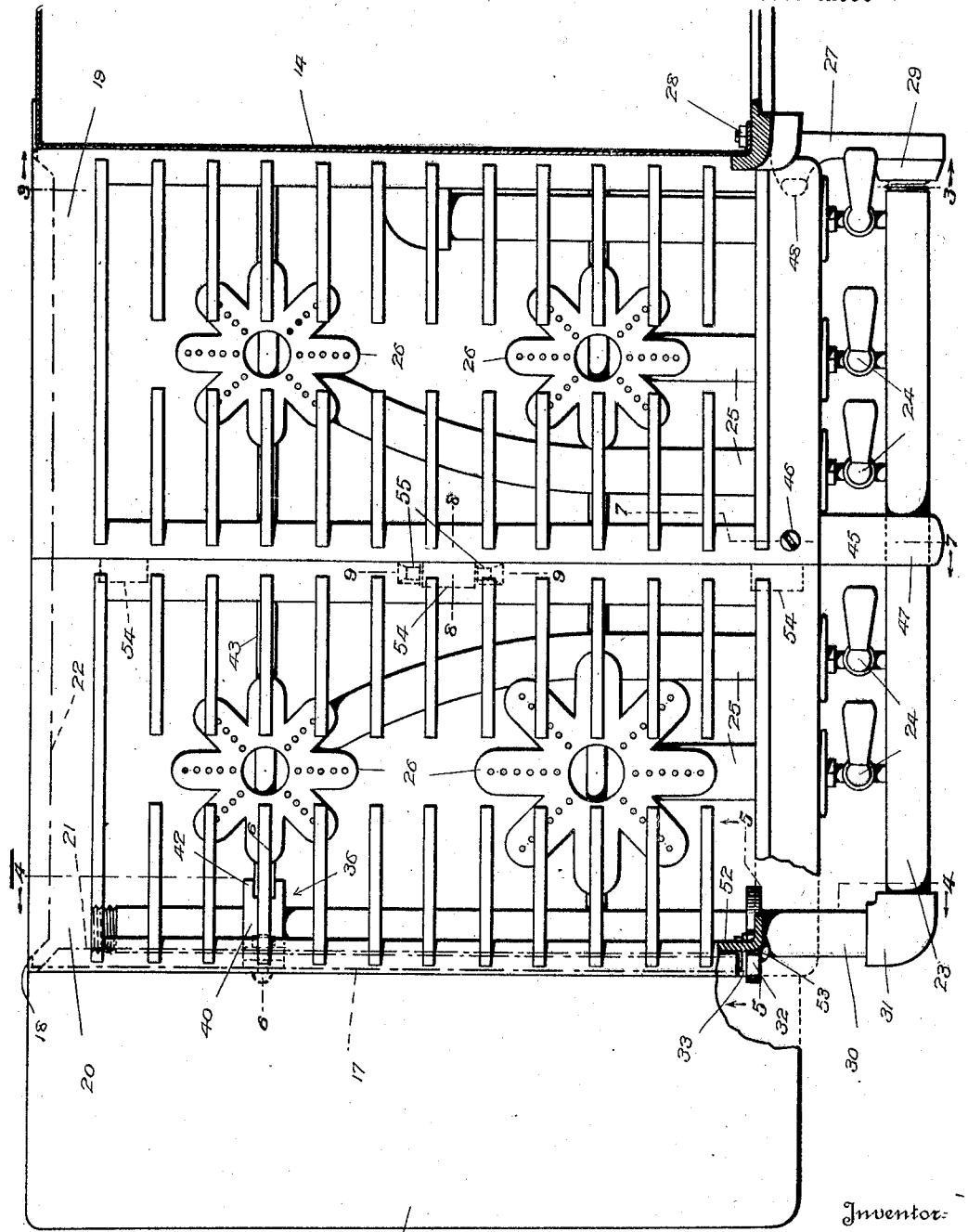

March 17, 1925.  1,530,002
H. LANGE
GAS RANGE OR COOKING STOVE
Filed Aug. 16, 1924   3 Sheets-Sheet 3
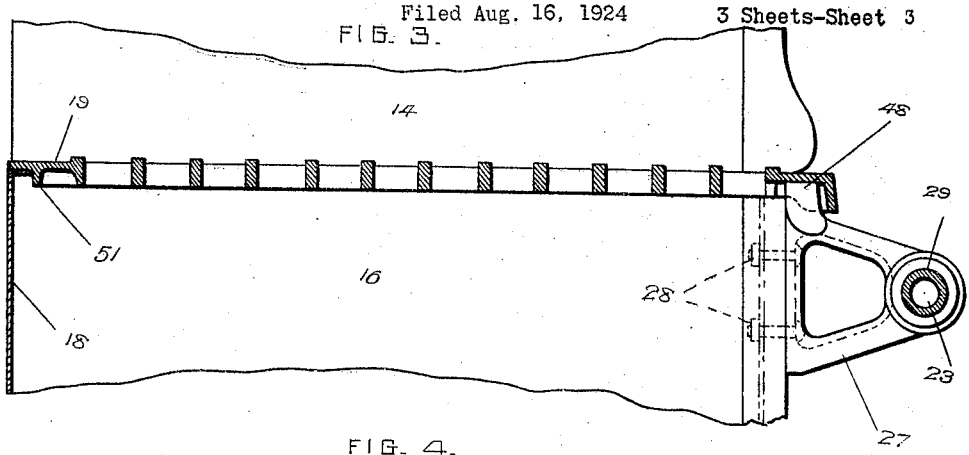
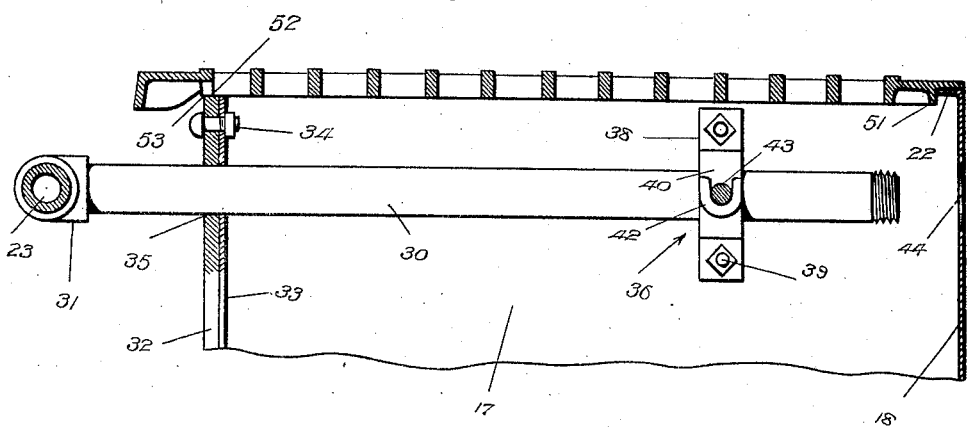
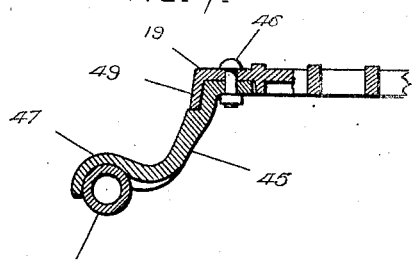
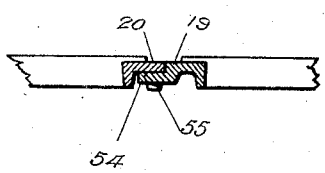
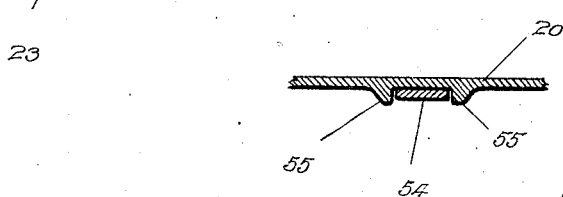
Inventor:
HENRY LANGE,
By Monroe E. Miller
Attorney.

Patented Mar. 17, 1925.

1,530,002

UNITED STATES PATENT OFFICE.

HENRY LANGE, OF QUINCY, ILLINOIS.

GAS RANGE OR COOKING STOVE.

Application filed August 16, 1924. Serial No. 732,492.

*To all whom it may concern:*

Be it known that I, HENRY LANGE, a citizen of United States, residing at Quincy, in the county of Adams and State of Illinois, have invented certain new and useful Improvements in Gas Ranges or Cooking Stoves, of which the following is a specification, reference being had therein to the accompanying drawing.

The present invention relates to gas ranges or cooking stoves, and aims to provide a novel and improved cooking top structure which eliminates the usual top frame, for purpose of economy, and which provides for other advantages.

Modern gas ranges and cooking stoves include a burner box at one side of the oven and broiler, with a cooking top frame secured on the burner box for holding and supporting the griddles or top sections, which may be of the open or closed type, and such top frame also serves as a support for the gas manifold or supply pipe. The cooking top frame is not only an item of expense in the manufacture of the range or stove, but also has other objections. The present invention eliminates the use of a cooking top frame, to reduce the cost of manufacture, and the griddles or top sections constitute in themselves the entire cooking top without a special supporting frame such as ordinarily used. The griddles are readily removed so as to completely open the burner box for access to the burners and other parts, and to also enable the burner box to be readily cleaned out.

Another object is the provision of a novel cooking top structure wherein the griddles or top sections are supported from the walls of the burner box and from the gas manifold or supply pipe and its supports, to provide a simple, practical and efficient arrangement.

A further object is the provision of novel means for mounting the gas manifold or supply pipe so that it and its supporting means can assist in supporting the griddles or top sections.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a perspective view of a gas range or cooking stove showing the improved cooking top structure embodied therein.

Fig. 2 is a plan view of the cooking top structure, portions being broken away and shown in section.

Figs. 3, 4, 5, 6, 7, 8 and 9 are vertical sections on the respective lines, 3—3, 4—4, 5—5, 6—6, 7—7, 8—8 and 9—9 of Fig. 2.

A conventional form of gas range or cooking stove is illustrated in the drawings, and the body thereof is composed of the oven 14, broiler 15 beneath the oven, and the burner box 16 at one side of the oven and broiler. As shown, the burner box is at the left hand side of the broiler, but the burner box may be at the opposite side, ranges and cooking stoves being made both ways and it will be understood that the top structure can be made for use at the right side of the oven and broiler as well as at the left side thereof. The burner box 16 has the outer side wall 17 and the rear or back wall 18, the front of the box being open, and the adjacent side wall of the broiler 15 forming the inner side wall of said box.

The cooking top consists of the griddles or top sections 19 and 20, which are disposed side by side, and which extend throughout the area of the top proper, without being disposed within a surrounding top frame as usually employed. The griddles may be of the open or closed type, being shown as "open," and said griddles are preferably cast from suitable metal. Said griddles extend across the burner box 16, and the walls 17 and 18 of said box are provided at their upper edges with the inturned flanges 21 and 22 to assist in supporting said griddles. Thus, the rear ends of the griddles seat on the flange 22 of the rear or back wall 18, while the outer edge portion of the griddle 20 seats on the flange 21.

The gas manifold or supply pipe 23 and its supports are used to assist in supporting the griddles. The manifold or pipe 23 extends across the front of the burner box 16 as usual, and has the gas valves 24 connected thereto from which the mixing tubes or pipes 25 extend to the burners 26 disposed under the griddles.

It is customary to support the manifold or pipe by hangers from the cooking top frame, but in the present construction the manifold or pipe is supported by the burner box and assists in supporting the top, thereby reversing the arrangement as generally used heretofore.

One end of the manifold or pipe 23 is screw-threaded or otherwise engaged with a supporting bracket 27 that is fastened by bolts 28 or otherwise to the body of the range or stove at the forward edge of the partition between the broiler 15 and box 16. Said bracket 27 projects forwardly from the body and has an integral cap 29 into which the end of the manifold or pipe is engaged, so as to close said end of the manifold, as well as to support same. A pipe 30 extends rearwardly from the other end of the manifold 23 and is located at the inner side of the wall 17, the adjacent ends of the manifold 23 and pipe 30 being connected by an elbow 31. Said pipe 30 is supported from the wall 17 so as to assist the bracket 27 in supporting the manifold 23 rigidly in front of the burner box. Thus, a corner post 32 is disposed at the front edge of the wall 17, and said edge of the wall has an inturned flange 33 against which the post 32 is secured by bolts 34 or other securing elements. The post 32 has an opening or aperture 35 through which the pipe 30 extends for supporting said pipe.

The wall 17 also carries a clamp or bracket 36 for holding the pipe 30 firmly in place. This clamp or bracket 36 comprises the sections 37 and 38 secured together and to the wall 17 by clamping bolts 39 or other securing elements. The section 38 has a loop 40 extending around the pipe 30, and the section 37 has the notched seat 41 fitting the pipe 30, so that the pipe is clamped between the loop 40 and seat 41, thereby not only supporting the pipe from the wall 17 but also fixing the pipe securely in position with reference to the burner box, assisted by the post 32 and bracket 27.

The loop 40 is formed with a notched lug 42 to receive and support one end of the rod 43 which supports the rear burners 26, such rods being generally used for supporting the burners.

The rear wall 18 of the burner box may have an opening 44 in rear of the pipe 30 for making connections with the supply of gas, and, if desired, the pipe 30 may extend rearwardly through the opening 44, or other provision made for pipe connections.

The forward end of the griddle 19 is supported from the manifold or pipe 23, and bracket 27. Thus, an arm or supporting member 45 is secured by a bolt 46 or otherwise to the griddle 19 underneath the front corner portion thereof adjacent to the griddle 20, and said arm extends downwardly and forwardly and is formed at its forward lower end with a curved portion 47 to seat snugly on the manifold 23, thereby not only supporting the corresponding corner portion of the griddle 19 but also preventing the griddle from being displaced or shifted forwardly or rearwardly when the portion 47 straddles the manifold 23, as seen in Fig. 7.

The bracket 27 is formed with an offset upstanding supporting lug 48 on which the other forward corner portion of the griddle 19 seats, so that the forward end of the griddle 19 is supported by the lug 48 of the bracket 27 and the arm or member 45, while the rear end of the griddle 19 seats on the flange 22.

The forward ends of the griddles 19 and 20 have the depending aprons or flanges 49 and 50, respectively, to finish off the griddles. The griddles also have depending ribs or flanges 51 extending along and abutting the edge of the flange 22, thereby limiting the rearward movement of the griddles. The griddle 20 has a depending rib or flange 52 extending along and bearing against the edge of the flange 21 to prevent the griddle 20 from moving laterally away from the griddle 19, and the rib or flange 52 also seats in a notch 53 in the upper end of the post 32, so that the outer forward corner portion of the griddle 20 is supported from the post 32.

The inner edge of the griddle 20 is supported from the adjacent edge of the griddle 19. Thus, the griddle 19 is provided with lips or supporting portions 54 at that edge thereof adjacent to the griddle 20 and projecting so as to form seats on which the inner edge portion of the griddle 20 can rest. Thus, the inner edge of the griddle 20 is supported by the lips 54, and the rear end and outer edge of the griddle 20 are supported by the flanges 22 and 21, respectively, while the outer forward corner portion of said griddle is supported by the post 32. The griddle 20 has depending lugs 55 disposed in front and in rear of the intermediate lip 54 so as to prevent the griddle 20 from sliding forwardly or rearwardly.

A shelf 56 may be provided as usual at the side of the burner box 16 flush with the cooking top, and said shelf may be supported by any suitable means (not shown) forming no part of the present invention.

Not only does the present construction eliminate the usual cooking top frame, so as to reduce the cost of manufacture, but there are other advantages obtained also. Thus, the griddle 20 can be lifted from the griddle 19 and burner box, after which the griddle 19 can be readily lifted from the burner box. This entirely opens the burner box, so that free access is had to the burners and to the burner box for purpose of repairs or cleaning. The cooking top, furthermore, has but a single line of division—that is, between the griddles 19 and 20, which gives a neater appearance, as well as reducing the crevices in the cooking top in which dirt, grease and other foreign matter can accumulate. The pipe 30 being secured to the side wall 17 of the burner box and the manifold or pipe 23 being secured to the bracket 27 will also brace the side wall 17 to maintain it in vertical position against inward or outward displacement. When the griddles are removed there is nothing whatever at the cooking surface above the burners 26 and mixing tubes 25 so that the burners can be readily removed and replaced.

Having thus described the invention, what is claimed as new is:—

1. In a gas cooking stove, a burner box having an open front, a gas manifold pipe secured to said box and extending across the front of the box, said pipe serving to brace the box, and a cooking top supported at its rear edge by the box and supported at its front edge by said pipe.

2. In a gas cooking stove, a burner box having an open front, a gas manifold pipe secured to said box across the front of the box and bracing the box, griddles disposed side by side and supported at their rear ends by the box, and means supporting the adjacent portions of the griddles at their forward ends from said pipe.

3. In a gas cooking stove, a burner box having an open front, members at the opposite sides of said open front rigidly secured to said box, a gas manifold pipe extending across said open front of the box and connected with said members to be supported by and to brace the box, griddles disposed side by side and supported at their rear ends by the box, said members having portions supporting the opposite front corner portions of the griddles, and means supporting the adjacent front corner portions of said griddles from said pipe.

4. In a gas cooking stove, a body having a burner box, a bracket carried by the body at one side of said box and having a cap, a gas pipe supported by said box and having one end secured in said cap to be closed and supported by said cap, and a cooking top supported on said box, said bracket having an upstanding lug on which the corresponding portion of said top is seated and supported.

5. In a gas cooking stove, a body having a burner box at one side, said burner box having an open front and a side wall opposite to the body, a bracket secured to the body, a gas pipe secured to said side wall, a manifold pipe secured to said pipe and to said bracket and disposed across the front of the box and bracing said side wall, and a cooking top supported by said box, said bracket having a portion supporting the corresponding portion of said top.

6. In a gas cooking stove, a body having a burner box at one side, said burner box having a side wall opposite to the body, a bracket carried by the body, a gas pipe supported by said side wall, a manifold pipe connected to said pipe and to said bracket and disposed across the front of the box, a cooking top comprising a pair of griddles having their rear ends supported by said box, and an arm secured to one griddle and resting on the manifold pipe, said bracket having a portion engaging said griddle to assist said arm in supporting the forward end of said griddle, said griddle and the other griddle having portions fitted together to support said other griddle from the first-named griddle.

7. In a gas cooking stove, a burner box having side and rear walls provided with inturned flanges at their upper edges, a bracket mounted at the side of the box opposite to said side wall, a gas pipe supported by said side wall, a manifold pipe connected at one end to said pipe and at its other end to said bracket, a cooking top composed of a pair of griddles disposed side by side having their rear ends bearing on the flange of said rear wall, said bracket having a portion supporting the corresponding forward corner portion of one griddle, and means for supporting the other forward corner portion of said griddle from the manifold pipe, the other griddle being supported by the flange of said side wall and by the first-named griddle.

8. In a gas cooking stove, a body having a burner box at one side provided with a side wall opposite to the body, a gas pipe secured to said side wall, a manifold pipe connected at one end to said pipe, and a bracket secured to the body and having a cap in which the other end of said manifold pipe is secured to support and close the last-named end of the manifold pipe and to rigidly connect the manifold pipe with the body to brace said side wall.

9. In a gas cooking stove, a body having a burner box at one side, said burner box having a side wall opposite to the body, a member secured to the forward edge of said side wall and having an opening, a gas pipe extending through said opening along said side wall, a bracket carried by said side wall and holding said pipe, a bracket carried by the body at the side of said box opposite to said side wall, and a manifold pipe connected at its opposite ends to the aforesaid pipe and last-named bracket.

10. In a gas cooking stove, a body having a burner box at one side, said burner box having side and rear walls provided with flanges at their upper edges, a member secured to the forward edge of said side wall and having an opening, a gas pipe extending through said opening and along said side wall, a bracket carried by said side wall and securing said pipe thereto, a bracket secured to said body at the side of the box opposite to said side wall, a manifold pipe connected at its opposite ends to the aforesaid pipe and last-named bracket, a cooking top composed of griddles disposed side by side and having their rear ends seated on the flange of the rear wall, the last-named bracket having a portion on which the corresponding forward corner portion of the adjacent griddle is seated, and an arm secured to the other forward corner portion of said griddle and having a portion seated on said manifold pipe, the other griddle being supported by the first-named griddle and the flange of said side wall.

11. In a gas cooking stove, a burner box having an open front and side and rear walls, a gas manifold pipe extending across the front of the box, means for rigidly supporting said pipe from the box so that the pipe braces said side wall of the box, and griddles extending to and supported from said side and rear walls and supported at their forward ends by said pipe and supporting means.

In testimony whereof I hereunto affix my signature.

HENRY LANGE.